(12) United States Patent
Park et al.

(10) Patent No.: US 11,251,678 B2
(45) Date of Patent: Feb. 15, 2022

(54) SMALL-SIZED MOTOR APPARATUS FOR VEHICLE PROVIDED WITH IMPROVED SHAFT THRUST GAP PREVENTION STRUCTURE

(71) Applicant: DY AUTO Corporation, Asan-si (KR)

(72) Inventors: Sung Min Park, Asan-si (KR); Jin Gyu Cho, Asan-si (KR)

(73) Assignee: DY AUTO Corporation, Asan-si (KR)

( * ) Notice: Subject to any disclaimer, the term of this patent is extended or adjusted under 35 U.S.C. 154(b) by 244 days.

(21) Appl. No.: 16/741,521

(22) Filed: Jan. 13, 2020

(65) Prior Publication Data

US 2020/0244142 A1 Jul. 30, 2020

(30) Foreign Application Priority Data

Jan. 24, 2019 (KR) .................. 10-2019-0009231

(51) Int. Cl.
*H02K 5/26* (2006.01)
*H02K 5/15* (2006.01)
(Continued)

(52) U.S. Cl.
CPC .............. *H02K 5/26* (2013.01); *H02K 5/15* (2013.01); *H02K 5/225* (2013.01); *H02K 5/24* (2013.01); *H02K 7/116* (2013.01)

(58) Field of Classification Search
CPC ............ H02K 5/26; H02K 5/15; H02K 5/225; H02K 5/24; H02K 7/116; H02K 7/081;
(Continued)

(56) References Cited

U.S. PATENT DOCUMENTS 5,127,764 A * 7/1992 Baer ..................... F16B 21/186
 403/316
6,789,803 B2 * 9/2004 Radosav .................. F16J 15/38
 277/377

(Continued)

FOREIGN PATENT DOCUMENTS

JP 2018064310 4/2018
KR 20033838 1/2004

OTHER PUBLICATIONS

Notice of Allowance for Korean Patent Application No. 10-2019-0009231, dated Nov. 25, 2019.

(Continued)

*Primary Examiner* — John K Kim
(74) *Attorney, Agent, or Firm* — Klarquist Sparkman, LLP (57) ABSTRACT

A small-sized motor apparatus for a vehicle, includes: a frame; a drive shaft mounted to the frame, a driven shaft to rotate dependently on the drive shaft, the driven shaft including a second worm gear; a cover coupled to the frame; a plate-shaped washer member; and a gap spring member preventing an axial movement of the driven shaft, the gap spring member being assembled in a radial direction of the driven shaft and installed such that one side of the gap spring member is contact-supported by the plate-shaped washer member and the other side of the gap spring member is supported by the frame, wherein the frame includes a slide groove that accommodates both ends of the gap spring member and the plate-shaped washer member and restricts the gap spring member from moving in an axial direction of the driven shaft.

6 Claims, 11 Drawing Sheets

(51) Int. Cl.
  *H02K 5/22* (2006.01)
  *H02K 5/24* (2006.01)
  *H02K 7/116* (2006.01)

(58) Field of Classification Search
  CPC .... H02K 7/1166; H02K 7/003; B60N 2/0232; B62D 5/0409; F16F 1/025
  USPC .......................................................... 310/91
  See application file for complete search history.

(56) References Cited

U.S. PATENT DOCUMENTS

| | | | | |
|---|---|---|---|---|
| 7,325,766 | B1* | 2/2008 | Schunck | B65H 54/106 |
| | | | | 242/149 |
| 7,971,937 | B2* | 7/2011 | Ishii | B60N 2/1615 |
| | | | | 297/330 |
| 9,726,291 | B2* | 8/2017 | Sonleiter | F16J 15/3208 |
| 2020/0244142 | A1* | 7/2020 | Park | H02K 5/26 |

OTHER PUBLICATIONS

Office Action for Korean Patent Application No. 10-2019-0009231, dated Sep. 9, 2019.

* cited by examiner

FIG. 1

(PRIOR ART)

SMALL-SIZED MOTOR APPARATUS FOR VEHICLE PROVIDED WITH IMPROVED SHAFT THRUST GAP PREVENTION STRUCTURE

CROSS-REFERENCE TO RELATED APPLICATION

This application claims the benefit of Korean Patent Application No. 10-2019-0009231, filed on Jan. 24, 2019, in the Korean Intellectual Property Office, the disclosure of which is incorporated herein in its entirety by reference.

FIELD

The inventive concept relates to a small-sized motor apparatus that is installed in a vehicle to enable various devices to be motorized.

DESCRIPTION OF THE RELATED ART

In general, a vehicle is an apparatus that carries people or cargo by driving wheels by the rotational force of an engine or a motor. The interior of the vehicle is provided with a device for a driver's or passenger's convenience, such as a seat and a steering system.

In related arts, it is common to manually operate the back and forth, left and right, and up and down movement of a seat or the angle adjustment of a backrest. However, according to the recent trend of high-end vehicles or motorization of convenience equipment, various motors are applied and thus the tendency toward automatic operation is increasing. In addition, the tilting or telescopic function of a steering wheel has been manually operated in the past, but in recent years, the tendency of motorization has increased.

According to such a trend, the demand for a small-sized motor for the motorization of the convenience equipment of the vehicle is increasing.

An example of a small-sized motor that is used for the purpose of motorizing the convenience equipment of the vehicle is disclosed in Korean patent registration No. 0856563. The registered patent includes, as a motor apparatus for adjusting the vertical position of a seat, a structure for preventing the axial movement of an output shaft (spindle) rotated dependently by a rotation axis of a motor.

Figure 1:
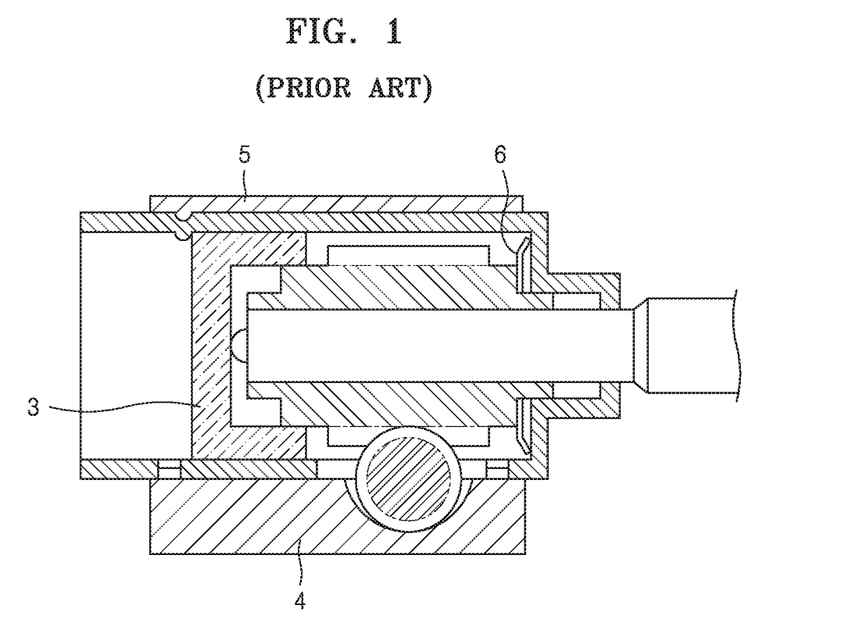
FIG. 1 is a view illustrating the structure of a small-sized motor apparatus according to a related art.

Referring to FIG. 1, the registered patent includes a sleeve 3 as a structure for preventing the axial movement of the output shaft. The sleeve 3 is installed to press the end of the output shaft through a hole or a groove provided in a gear housing 4. The sleeve 3 is installed to be fixed to the gear housing 4 by the caulking of the gear housing 4 or a gear cover 5 while being inserted into the gear housing 4. The sleeve 3 may be screwed to the gear housing 4. A leaf spring 6 is assembled to one side of the worm gear of the output shaft in order to assist a movement prevention function of the sleeve 3. The leaf spring 6 cooperates with the sleeve 3 to prevent an axial movement of the output shaft.

However, the registered patent requires a caulking process or a screw assembly process to fix the sleeve 3 to the gear housing 4. Accordingly, a structure such as that of the registered patent requires a mold or an apparatus for caulking or screwing. In addition, since a process for fine adjustment of the sleeve 3 is also necessary, the assembly of components for preventing an axial thrust gap of the output shaft is not good, and there is a problem that productivity is low due to high production cost.

An object of the inventive concept is to solve problems as described above and to improve the assimilability and productivity by improving an axial movement prevention structure of an output shaft of a small-sized motor for a vehicle.

SUMMARY

According to an aspect of the inventive concept, there is provided a small-sized motor apparatus for a vehicle, which has an improved shaft thrust gap prevention structure, the small-sized motor apparatus including: a frame at least partially open;

a drive shaft installed to the frame and rotating according to the electromagnetic induction law, the drive shaft including a first worm gear;

a driven shaft rotatably mounted to the frame and mechanically connected to the drive shaft to rotate dependently on the drive shaft, the driven shaft including a second worm gear;

a cover coupled to the frame to close an open portion of the frame;

a plate-shaped washer member coupled to one end of the second worm gear; and a gap spring member preventing an axial movement of the driven shaft, the gap spring member being assembled in a radial direction of the driven shaft and installed such that one side of the gap spring member is contact-supported by the plate-shaped washer member and the other side of the gap spring member is supported by the frame, wherein the frame includes a slide groove that accommodates both ends of the gap spring member and the plate-shaped washer member and restricts the gap spring member from moving in an axial direction of the driven shaft, wherein the gap spring member includes: a first spring portion that presses and supports an outer circumferential surface of the driven shaft from left and right; and a second spring portion integrally formed on an upper portion of the first spring portion and formed to be elastically deformable with respect to the first spring portion in a direction perpendicular to a pressing direction of the first spring portion.

The first spring portion may be formed in a tapered structure such that a cross-sectional area of the first spring portion decreases from an upper side toward a lower side in the longitudinal direction of the driven shaft.

The slide groove may have a first contact surface and a second contact surface, wherein the first contact surface may be in contact with the plate-shaped washer member in a longitudinal direction of the driven shaft and may be perpendicular to the longitudinal direction of the driven shaft, and the second contact surface may be in contact with the gap spring member and may be inclined such that a distance from the first contact surface decreases from an upper side toward a lower side of the second contact surface.

The first spring portion may include a fixing portion slidingly coupled to both side walls of the slide groove, and a pressing elastic portion extending upward from a lower end of the fixing portion to have a space spaced from the fixing portion.

The second spring portion may include a head in a form of a circular ring, and a bending elastic portion having a shoulder-shaped structure extending in a horizontal direction from a lower end of the head.

The pressing elastic portion may be symmetrically formed on both sides with the driven shaft therebetween, and upper ends of the pressing elastic portion may be arranged to be spaced apart from each other.

The cover may include a head pressing groove that partially accommodates an upper end portion of the head when coupled with the frame and fixes a pressing position of the gap spring member when the head is pressed.

The first spring portion and the second spring portion may be formed by bending and processing a single metal material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
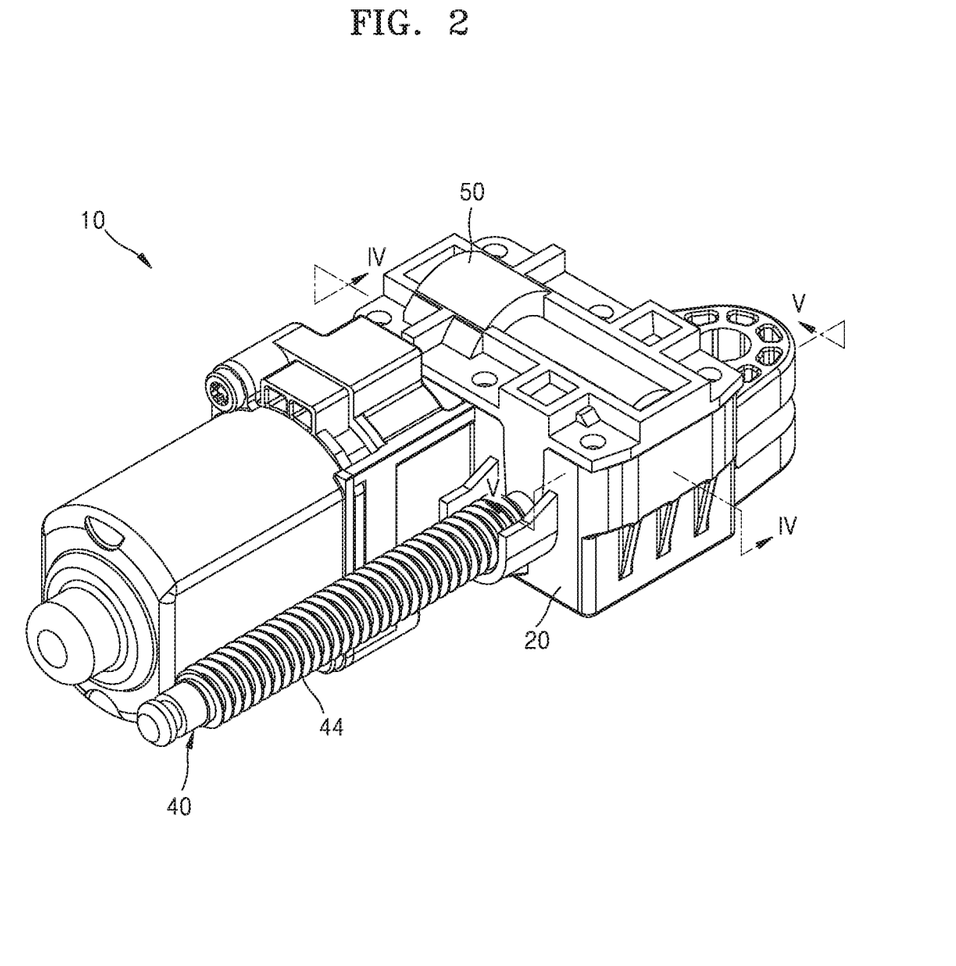
FIG. 2 is a perspective view of a small-sized motor apparatus for a vehicle according to an embodiment of the inventive concept.
Figure 3:
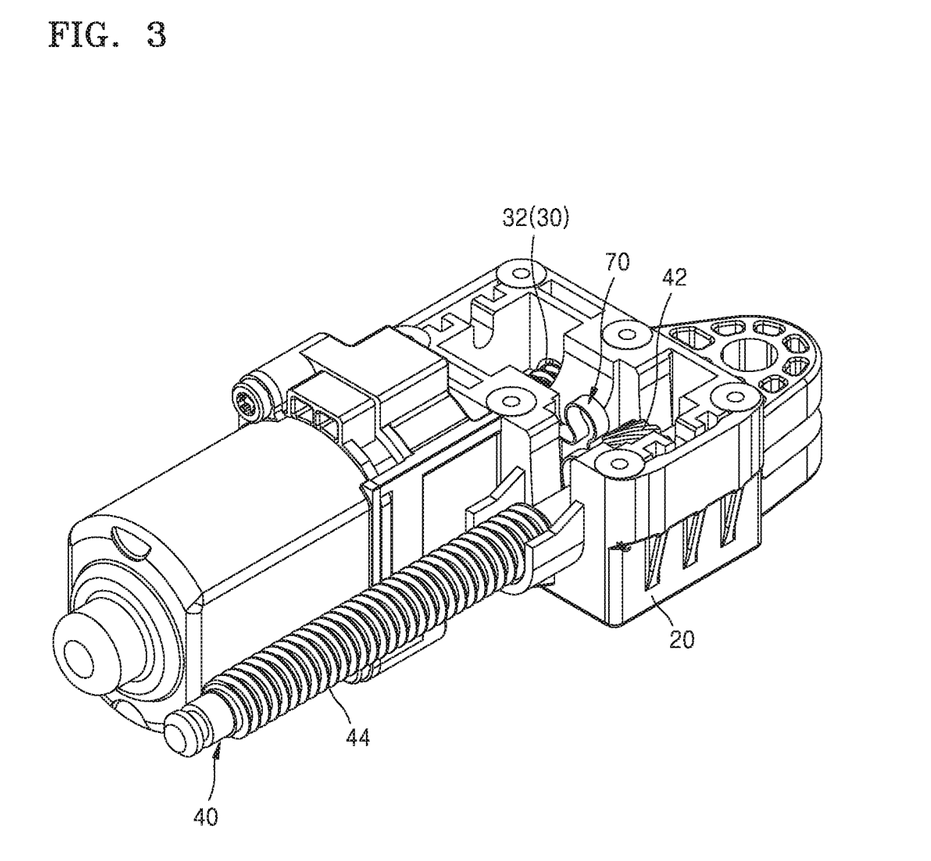
FIG. 3 is a view illustrating a state in which a cover is separated from the small-sized motor apparatus for a vehicle shown in FIG. 2.
Figure 4:
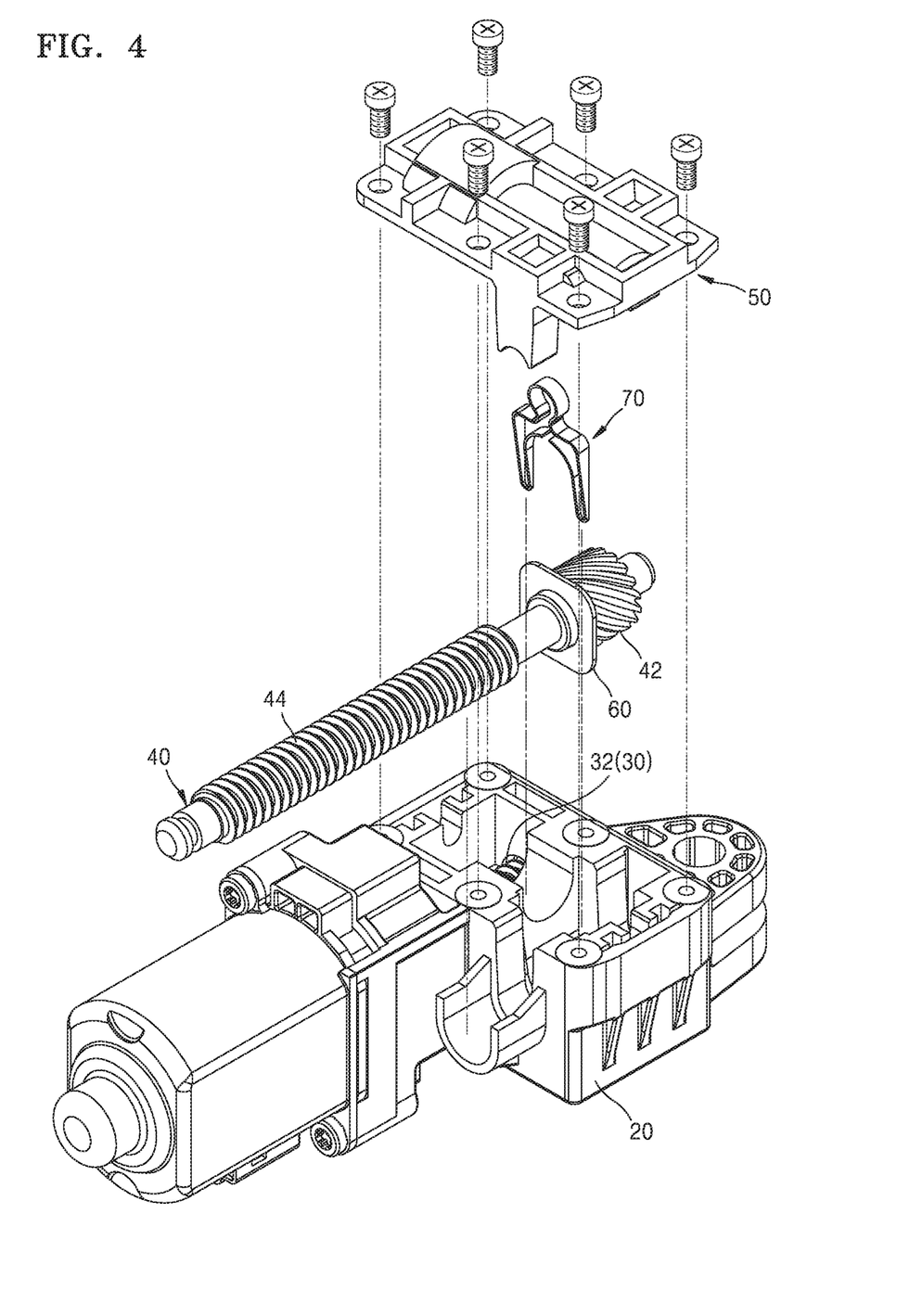
FIG. 4 is an exploded perspective view of the small-sized motor apparatus for a vehicle shown in FIG. 2.
Figure 5:
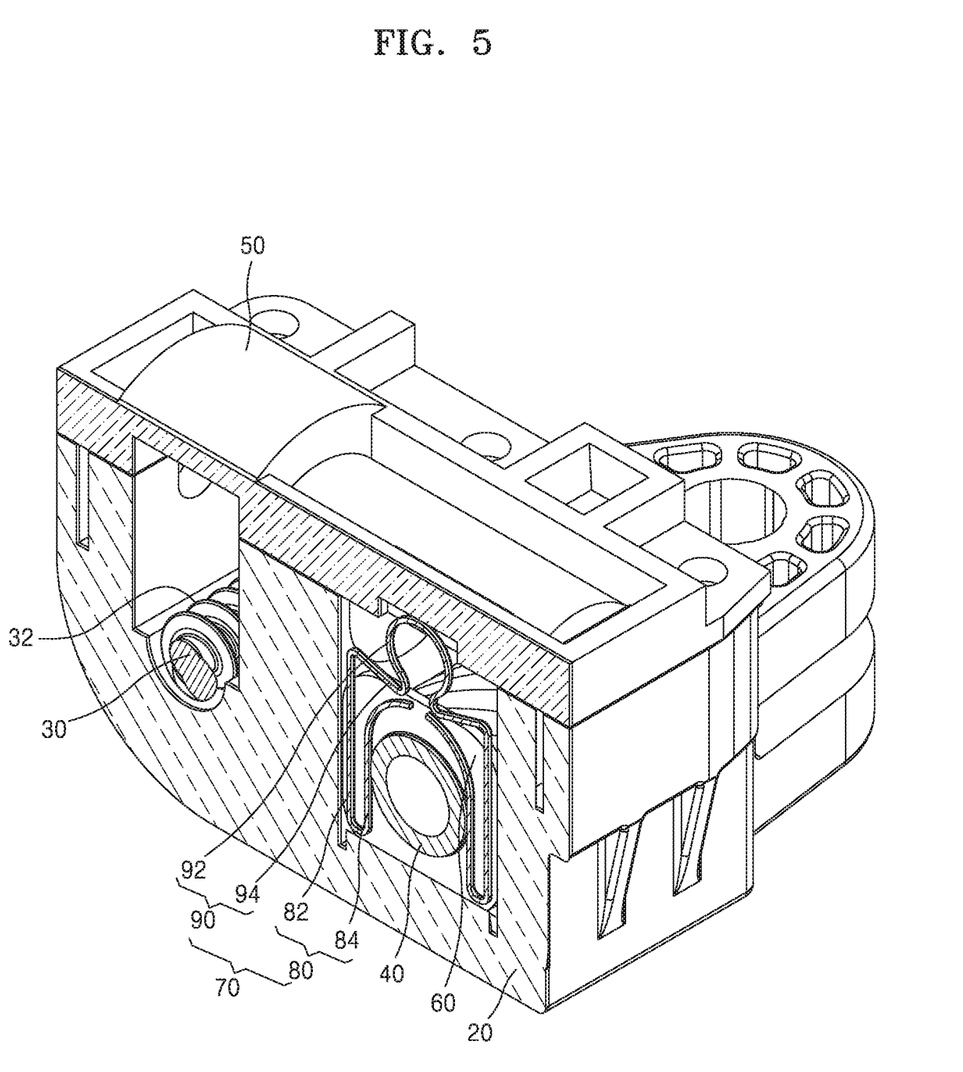
FIG. 5 is a cross-sectional view taken along line IV-IV shown in FIG. 2.
Figure 6:
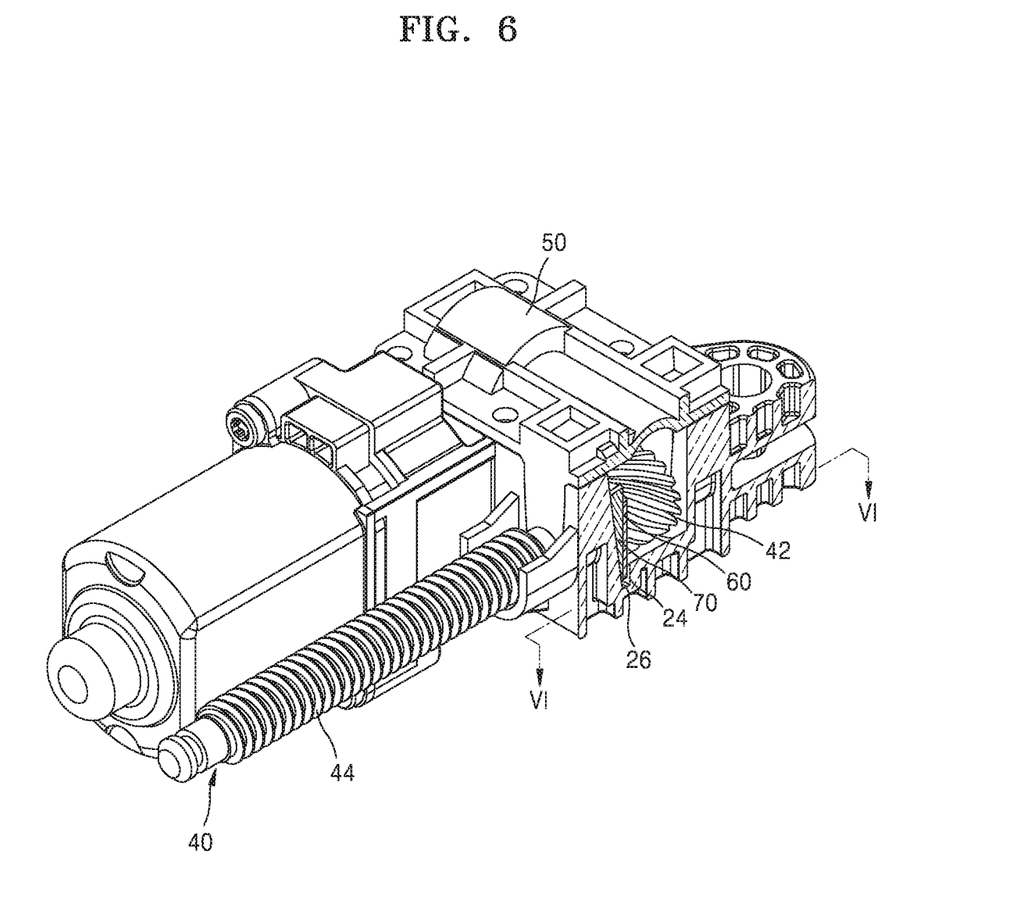
FIG. 6 is a cross-sectional view taken along line V-V of FIG. 2.
Figure 7:
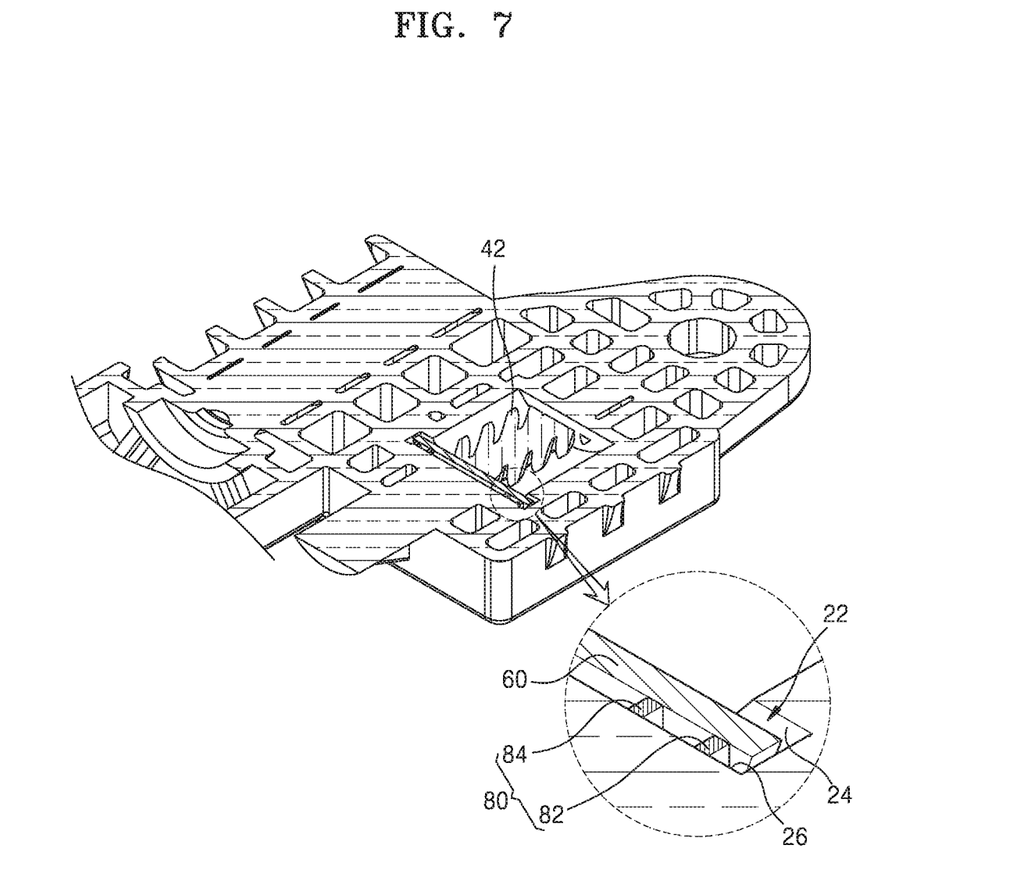
FIG. 7 is a cross-sectional view taken along line VI-VI of FIG. 5.
Figure 8:
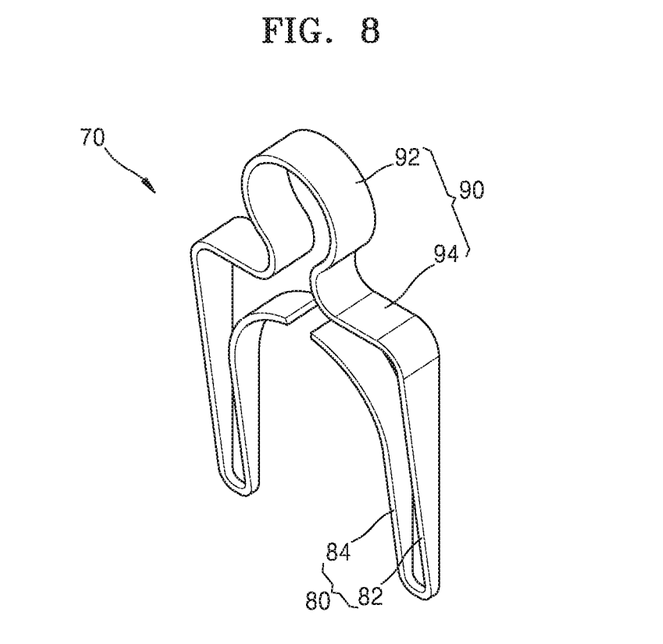
FIG. 8 is a view illustrating a detailed structure of a gap spring member shown in FIG. 3.
Figure 9:
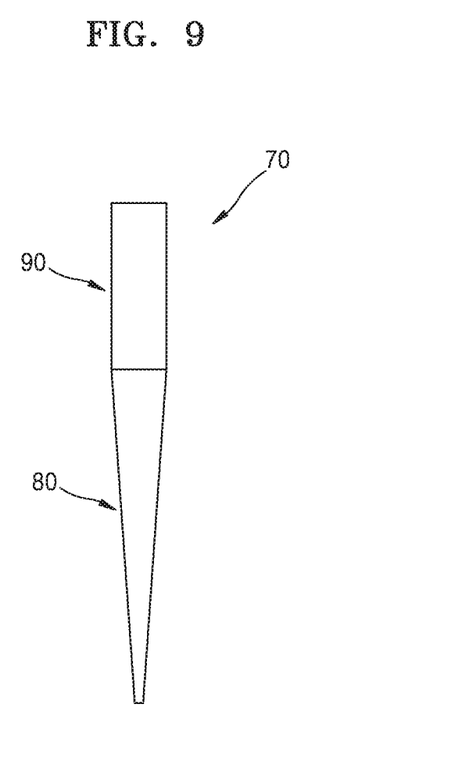
FIG. 9 is a side view of the gap spring member shown in FIG. 8.
Figure 10:
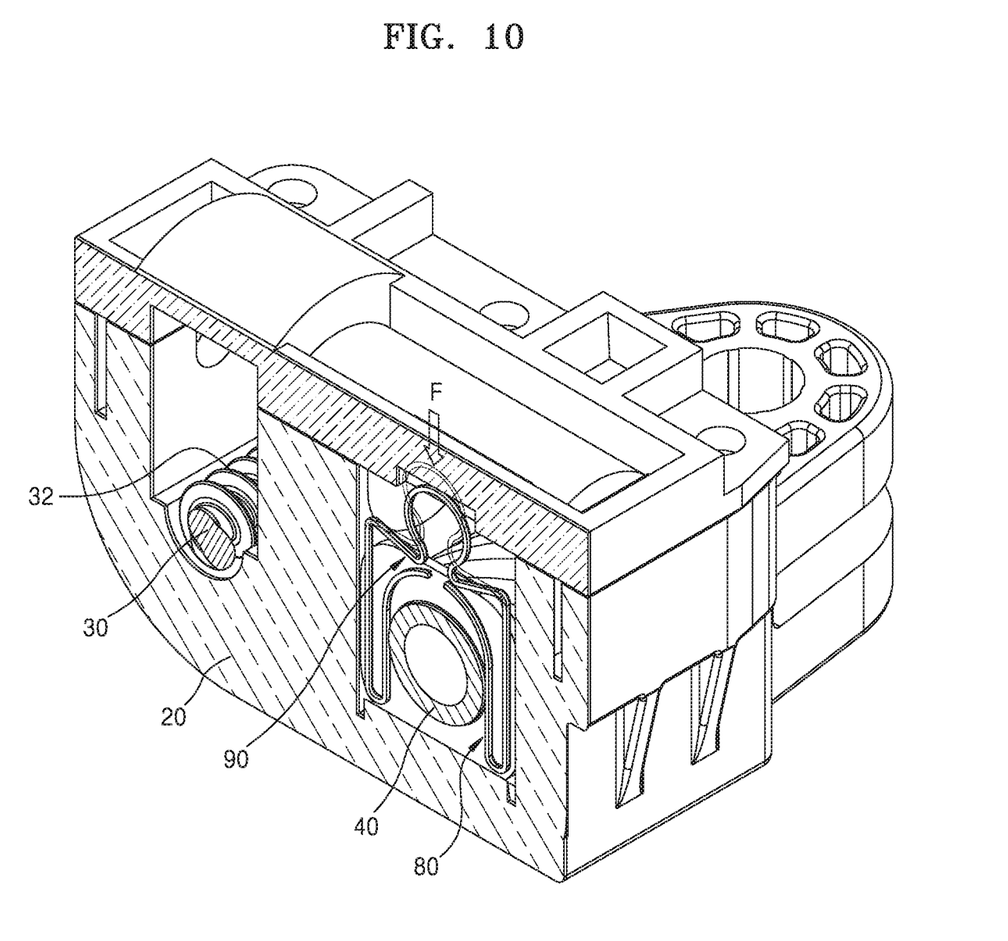
FIG. 10 is a view corresponding to FIG. 5, the view illustrating an elastic deformation form of a second spring portion when the gap spring member is assembled.
Figure 11:
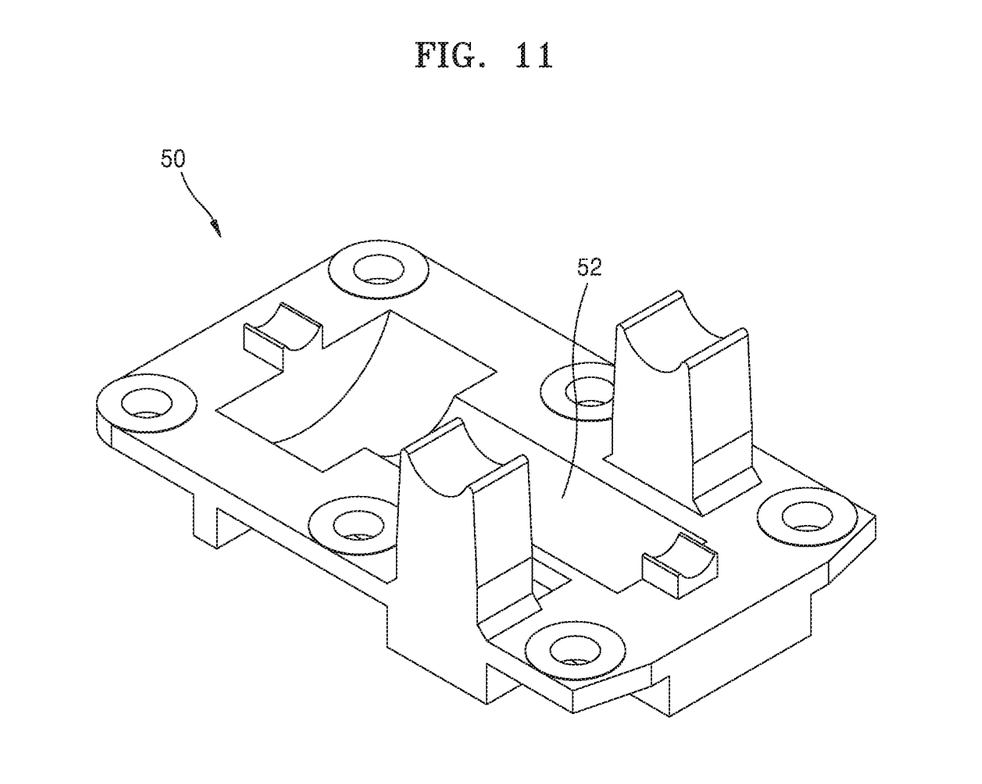
FIG. 11 is a view illustrating a structure of a cover shown in FIG. 3.

FIG. 2 is a perspective view of a small-sized motor apparatus for a vehicle according to an embodiment of the inventive concept. FIG. 3 is a view illustrating a state in which a cover is separated from the small-sized motor apparatus for a vehicle shown in FIG. 2. FIG. 4 is an exploded perspective view of the small-sized motor apparatus for a vehicle shown in FIG. 2. FIG. 5 is a cross-sectional view taken along line IV-IV shown in FIG. 2. FIG. 6 is a cross-sectional view taken along line V-V of FIG. 2. FIG. 7 is a cross-sectional view taken along line VI-VI of FIG. 5. FIG. 8 is a view illustrating a detailed structure of a gap spring member shown in FIG. 3. FIG. 9 is a side view of the gap spring member shown in FIG. 8. FIG. 10 is a view corresponding to FIG. 5, the view illustrating an elastic deformation form of a second spring portion when the gap spring member is assembled. FIG. 11 is a view illustrating a structure of a cover shown in FIG. 3.

Referring to FIGS. 2 to 11, a small-sized motor apparatus 10 for a vehicle, which has an improved shaft thrust gap prevention structure, according to an embodiment of the inventive concept may include a frame 20, a drive shaft 30, a driven shaft 40, a cover 50, a washer member 60, and a gap spring member 70.

The frame 20 may be manufactured by injection-molding a synthetic resin or by die-casting an aluminum alloy. The frame 20 has a structure that is at least partially open. The open structure of the frame 20 is closed by the cover 50 which will be described below. The frame 20 is provided with the drive shaft 30 and the driven shaft 40, which will be described below. The frame 20 is provided with a slide groove 22. The slide groove 22 is a groove portion to which the gap spring member 70, which will be described below, is assembled. The slide groove 22 is formed such that an entrance is arranged in the open structure of the frame 20. The slide groove 22 forms a tapered structure that narrows from the upper end toward the lower end. A more specific structure of the slide groove 22 will be described below.

The drive shaft 30 is rotatably installed in the frame 20. The drive shaft 30 is a rotation axis of a motor that generally includes a stator and a rotor. The drive shaft 30 is rotated by the electromagnetic induction between the stator and the rotor. Since the rotation principle of the drive shaft 30 corresponds to a well-known rotation principle of the motor, a detailed description thereof will be omitted. The drive shaft 30 includes a first worm gear 32. The first worm gear 32 is provided for mechanically connecting the driven shaft 40 to the drive shaft 30.

The driven shaft 40 is rotatably installed in the frame 20. The driven shaft 40 may be installed in parallel to the drive shaft 30. The driven shaft 40 is mechanically connected to the drive shaft 30. The driven shaft 40 rotates dependently on the drive shaft 30. The driven shaft 40 includes a second worm gear 42. The second worm gear 42 may be mechanically connected to the first worm gear 32 by a worm wheel (not shown), a mechanical element corresponding thereto, or the like. Since the mechanical connection structure may be easily configured by adopting a known structure, a mechanical element connecting the first worm gear 32 to the second worm gear 42 is not shown in the drawings showing the embodiment of the inventive concept. A tip portion of the second worm gear 42 is installed to be caught in the frame 20, and thus, its movement is limited in one direction.

The driven shaft 40 includes an output gear 44. The output gear 44 may be coupled to, for example, a rack gear that directly controls the movement of the seat.

The cover 50 may be fixed to the frame 20 by means such as bolts or screws. The cover 50 is coupled to the frame 20 to close an open portion of the frame 20. The cover 50 is provided with a head pressing groove 52. The head pressing groove 52 is a recess formed to partially accommodate an upper end portion of a head 92 of the gap spring member 70 that will be described below. The head pressing groove 52 is provided to fix a pressing position of the head 92 of the gap spring member 70 such that the head 92 is pressed in a direction, in which the cover 50 is assembled, without moving when the head 92 is pressed.

The washer member 60 is a plate-shaped member. The washer member 60 is arranged to be rotatably coupled to an outer circumferential surface of the driven shaft 40. The washer member 60 is coupled to be in contact with one end of the second worm gear 42. The washer member 60 serves as a kind of friction bearing. That is, the washer member 60 is fixed to the frame 20 and does not rotate, and the driven shaft 40 rotates in contact with the washer member 60. In addition, the lower end of the washer member 60 is accommodated in the slide groove 22.

The gap spring member 70 is a member that prevents an axial movement of the driven shaft 40. The gap spring member 70 is coupled to an intermediate portion of the driven shaft 40 in a longitudinal direction of the driven shaft 40. The gap spring member 70 is assembled in a radial direction of the driven shaft 40. One side of the gap spring member 70 is contact-supported by the washer member 60. The other side of the gap spring member 70 is supported by the frame 20.

The slide groove 22 accommodates both ends of the gap spring member 70 and the washer member 60. The slide groove 22 restricts the gap spring member 70 from moving in an axial direction of the driven shaft 40.

The slide groove 22 has a first contact surface 24 and a second contact surface 26. The first contact surface 24 and the second contact surface 26 are spaced apart from each other in the longitudinal direction of the driven shaft 40. The first contact surface 24 is in contact with the washer member 60 in the longitudinal direction of the driven shaft 40. The first contact surface 24 is perpendicular to the longitudinal direction of the driven shaft 40. On the other hand, the second contact surface 26 is a surface spaced apart from the first contact surface 24 in the longitudinal direction of the driven shaft 40. The second contact surface 26 is in contact with the gap spring member 70. The second contact surface 26 is formed to be inclined such that the distance from the first contact surface 24 decreases from the upper side to the lower side in the assembly direction of the gap spring member 70.

The gap spring member 70 includes a first spring portion 80 and a second spring portion 90.

The first spring portion 80 presses and supports the outer circumferential surface of the driven shaft 40 from left and right. The second spring portion 90 is integrally formed on an upper portion of the first spring portion 80. The second spring portion 90 is formed to be elastically deformable with respect to the first spring portion 80 in a direction perpendicular to the pressing direction of the first spring portion 80.

The first spring portion 80 is formed in a tapered structure such that the cross-sectional area of the first spring portion 80 decreases from the upper side to the lower side in the longitudinal direction of the driven shaft 40.

The first spring portion 80 includes a fixing portion 82 and the pressing elastic portion 84.

The fixing portion 82 is slidingly coupled to both side walls of the slide groove 22.

The pressing elastic portion 84 is formed to extend upward from the lower end of the fixing portion 82 to have a space spaced from the fixing portion 82.

The pressing elastic portion 84 is formed symmetrically on both sides with the driven shaft 40 therebetween. The upper ends of a pair of pressing elastic portions 84 are arranged to be spaced apart from each other. The fixing portion 82 maintains a constant shape in a state in which the fixing portion 82 is coupled to the frame 20, and the pressing elastic portion 84 adjusts a thrust gap in the radial direction of the driven shaft 40 when the driven shaft 40 is rotated.

The second spring portion 90 includes a head 92 and a bending elastic portion 94.

The head 92 is a structure in the form of a circular ring. The head 92 maintains a circular ring shape without elastic deformation even when an external force is applied.

The bending elastic portion 94 includes a shoulder-shaped structure extending in the horizontal direction from the lower end of the head 92. The bending elastic portion 94 may include a beam-shaped structure, and one end of the bending elastic portion 94 is connected to the head 92 and the other end of the bending elastic portion 94 is connected to the upper end of the fixing portion 82. Accordingly, the bending elastic portion 94 has a bending elastic restoring force. When the gap spring member 70 is assembled to the slide groove 22, the bending elastic portion 94 absorbs a portion of an excessive external force even when the excessive external force is applied, thereby preventing excessive insertion of the gap spring member 70.

The first spring portion 80 and the second spring portion 90 may be formed by bending and processing a single metal material. The first spring portion 80 and the second spring portion 90 may be manufactured by injection-molding a synthetic resin material.

The operation and effect of the inventive concept will be described in detail with reference to the assembly process of the small-sized motor apparatus 10 including the above-described components.

Firstly, a key component of the inventive concept is the gap spring member 70. Therefore, a process of assembling the gap spring member 70 in a state where other components are assembled will be described.

In a state where the gap spring member 70 is not assembled, the driven shaft 40 may move in the longitudinal direction of the driven shaft 40. The axial movement of the driven shaft 40 is generated by thrust force. The thrust force happens in the longitudinal direction of the driven shaft 40 is generated when indoor equipment of a vehicle coupled to the output gear 44, for example, a seat, moves, according to a mechanical connection between the drive shaft 30 and the driven shaft 40. Accordingly, the driven shaft 40 moves in the longitudinal direction during the operation thereof. In this case, the movement of the indoor equipment connected to the output gear 44 is not precise. To solve this problem, the gap spring member 70 is used.

The gap spring member 70 is slidingly coupled along the slide groove 22. Among the components constituting the gap spring member 70, the fixing portion 82 of the first spring portion 80 is fixed to the slide groove 22. At the same time, the pressing elastic portion 84 of the first spring portion 80 elastically presses the driven shaft 40 on both sides in contact with the outer circumferential surface of the driven shaft 40. Accordingly, since the driven shaft 40 is pressed toward the center in the radial direction, the driven shaft 40 may maintain a constant position. The pressing elastic portion 84 may be contact-supported in a semicircle shape along the circumference of the driven shaft 40.

In addition, in a process in which the gap spring member 70 is slidingly coupled along the slide groove 22, a tapered structure in which the gap spring member 70 and the slide groove 22 narrow from the upper side to the lower side is formed. Therefore, according to the insertion depth of the gap spring member 70, the axial thrust gap amount of the driven shaft 40 may be adjusted. The insertion depth of the gap spring member 70 may be adjusted differently according to the specification of the motor apparatus.

In addition, the bending elastic portion 94 constituting the second spring portion 90 of the gap spring member 70 absorbs a portion of an excessive pressure even when the excessive pressure is applied to the head 92, and thus, the gap spring member 70 is prevented from being excessively inserted into the slide groove 22.

In addition, the cover 50 presses the head of the gap spring member 70 in the process of being fixed to the frame 20 by means such as bolts or screws. Therefore, by an elastic restoring force of the bending elastic portion 94, the second spring 90 is prevented from being separated from the slide groove 22. In addition, the head pressing groove 52 provided in the cover 50 provides the effect of fixing a pressing position so that the cover 50 presses a certain position of the upper end of the head 92.

As described above, a small-sized motor apparatus for a vehicle according to the inventive concept prevents an axial movement of a driven shaft by using a gap spring member. Therefore, a sleeve structure that is used in the existing motor is not required, thereby improving the assemblability. In addition, a caulking device or mold for assembling a sleeve is not required, and thus, manufacturing cost is reduced and productivity is improved.

In addition, since the gap spring member has a tapered structure as in the embodiment of the inventive concept, the gap adjustment of the driven shaft according to the specifications of the motor may be easily implemented by adjusting the insertion depth of the gap spring member.

In addition, when a first spring portion and a second spring portion of the gap spring member are integrally formed as in the embodiment of the inventive concept, the structure of the small-sized motor apparatus for a vehicle is simple and the manufacturing cost thereof is reduced.

In addition, when the first spring portion includes a fixing portion and a pressing elastic portion as in the embodiment of the inventive concept, a gap may be adjusted in the radial direction of the driven shaft.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A small-sized motor apparatus for a vehicle, which has an improved shaft thrust gap prevention structure, the small-sized motor apparatus comprising:
    a frame that is at least partially open;
    a drive shaft mounted to the frame and rotating according to the electromagnetic induction law, the drive shaft including a first worm gear;
    a driven shaft rotatably mounted to the frame and mechanically connected to the drive shaft to rotate dependently on the drive shaft, the driven shaft including a second worm gear;
    a cover coupled to the frame to close an open portion of the frame;
    a plate-shaped washer member coupled to one end of the second worm gear; and
    a gap spring member preventing an axial movement of the driven shaft, the gap spring member being assembled in a radial direction of the driven shaft and installed such that one side of the gap spring member is contact-supported by the plate-shaped washer member and the other side of the gap spring member is supported by the frame,
    wherein the frame includes a slide groove that accommodates both ends of the gap spring member and the plate-shaped washer member and restricts the gap spring member from moving in an axial direction of the driven shaft,
    wherein the gap spring member includes: a first spring portion that presses and supports an outer circumferential surface of the driven shaft from left and right; and a second spring portion integrally formed on an upper portion of the first spring portion and formed to be elastically deformable with respect to the first spring portion in a direction perpendicular to a pressing direction of the first spring portion,
    wherein the first spring portion is formed in a tapered structure such that a cross-sectional area of the first spring portion decreases from an upper side toward a lower side in the longitudinal direction of the driven shaft, and
    wherein the slide groove has a first contact surface and a second contact surface, wherein the first contact surface is in contact with the plate-shaped washer member in a longitudinal direction of the driven shaft and is perpendicular to the longitudinal direction of the driven shaft, and the second contact surface is in contact with the gap spring member and is inclined such that a distance from the first contact surface decreases from an upper side toward a lower side of the second contact surface.

2. The small-sized motor apparatus of claim 1, wherein the first spring portion includes a fixing portion slidingly coupled to both side walls of the slide groove, and a pressing elastic portion extending upward from a lower end of the fixing portion to have a space spaced from the fixing portion.

3. The small-sized motor apparatus of claim 1, wherein the second spring portion includes a head in a form of a circular ring, and a bending elastic portion having a shoulder-shaped structure extending in a horizontal direction from a lower end of the head.

4. The small-sized motor apparatus of claim 2, wherein the pressing elastic portion is symmetrically formed on both sides with the driven shaft therebetween, and upper ends of the pressing elastic portion are arranged to be spaced apart from each other.

5. The small-sized motor apparatus of claim 3, wherein the cover includes a head pressing groove that partially accommodates an upper end portion of the head when coupled with the frame and fixes a pressing position of the gap spring member when the head is pressed.

6. The small-sized motor apparatus of claim 1, wherein the first spring portion and the second spring portion are formed by bending and processing a single metal material.

* * * * *